US011779000B2

(12) United States Patent
Nakamura et al.

(10) Patent No.: US 11,779,000 B2
(45) Date of Patent: Oct. 10, 2023

(54) ONE-WAY CLUTCH UNIT FOR FISHING REEL AND FISHING REEL

(71) Applicant: Shimano Inc., Sakai (JP)

(72) Inventors: Kouhei Nakamura, Sakai (JP); Kunio Takechi, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 17/728,128

(22) Filed: Apr. 25, 2022

(65) Prior Publication Data

US 2022/0400663 A1    Dec. 22, 2022

(30) Foreign Application Priority Data

Jun. 22, 2021 (JP) ................... 2021-103296

(51) Int. Cl.
*A01K 89/01* (2006.01)
*A01K 89/033* (2006.01)
*B65H 75/44* (2006.01)

(52) U.S. Cl.
CPC ......... *A01K 89/05* (2015.05); *B65H 75/4442* (2013.01)

(58) Field of Classification Search
CPC .......... A01K 89/0155; A01K 89/01928; A01K 89/0193; A01K 89/01931; A01K 89/046; A01K 89/05; A01K 89/058; A01K 89/059
See application file for complete search history.

(56) References Cited

U.S. PATENT DOCUMENTS

| 1,781,695 A | * | 11/1930 | Lorenzo | ............. A01K 89/0155 192/76 |
| 2022/0338456 A1 | * | 10/2022 | Nakamura | ............. A01K 89/05 |

FOREIGN PATENT DOCUMENTS

| CN | 104041471 B | * | 9/2018 | ......... A01K 89/0155 |
| CN | 104621064 B | * | 10/2019 | ........... A01K 89/015 |
| JP | 6560903 B2 | | 8/2019 | |
| KR | 20080069515 A | * | 7/2008 | ......... A01K 89/0155 |

* cited by examiner

*Primary Examiner* — Emmanuel M Marcelo
(74) *Attorney, Agent, or Firm* — United IP Counselors, LLC

(57) ABSTRACT

A one-way clutch unit for a fishing reel is disclosed. The one-way clutch is configured to brake a rotation of a shaft member of the fishing reel. The one-way clutch includes a rolling element and an outer member. The rolling element contacts the shaft member in a radial direction away from an axle of the shaft member. The outer member is disposed outside the rolling element in the radial direction. The outer member is configured to rotate in only one direction along a circumferential direction around the axle. The outer member includes a first external force receiving portion that receives a first external force in an axial direction of the shaft member.

13 Claims, 8 Drawing Sheets

ONE-WAY CLUTCH UNIT FOR FISHING REEL AND FISHING REEL

CROSS-REFERENCE TO RELATED APPLICATIONS

This application claims priority to Japanese Patent Application No. 2021-103296, filed Jun. 22, 2021. The contents of that application are incorporated by reference herein in their entirety.

TECHNICAL FIELD

This invention relates to a one-way clutch unit for a fishing reel and a fishing reel.

BACKGROUND ART

A fishing reel, for example, the double-bearing reel disclosed in Japanese Patent No. 6560903, has a reel body, a spool shaft, and a one-way clutch unit. The spool shaft is rotatably supported by the reel body.

The one-way clutch unit has a rolling element and an outer member. The rolling element contacts the spool shaft in the radial direction. The outer member serves as the outer ring of the rolling element. The outer member is located outside the rolling element in the radial direction. The outer member rotates in only one direction along the circumferential direction.

BRIEF SUMMARY

In the conventional configuration, a friction plate contacts the one-way clutch unit. In more detail, the friction plate contacts the end face of the outer member of the one-way clutch unit. In this case, it is difficult to apply a stable braking force to the outer member, especially since the plate contacts the end surface of the outer member where no friction is assumed.

The object of the present invention is to provide a one-way clutch unit for a fishing reel that can stably apply a braking force to an outer member.

The one-way clutch unit for a fishing reel in accordance with one aspect of the present invention is configured to brake rotation of a shaft member of the fishing reel. The one-way clutch unit for a fishing reel has a rolling element and an outer member. The rolling element contacts the shaft member in a radial direction away from an axle of the shaft member. The outer member is disposed outside the rolling element in the radial direction. The outer member rotates only in one direction along a circumferential direction around the axle of the shaft member. The outer member is provided with a first external force receiving portion that receives a first external force in an axial direction in which the axle extends.

In the one-way clutch unit for the fishing reel, the outer member receives the first external force in the axial direction at the first external force receiving portion. As a result, a braking force can be stably applied to the outer member.

In the one-way clutch unit for the fishing reel according to another aspect of the present invention, the first external force receiving portion preferably has a first convex portion protruding in the axial direction. In this configuration, the outer member receives the first external force in the axial direction at the first convex portion. As a result, the braking force can be stably applied to the outer member.

In the one-way clutch unit for a fishing reel in accordance with another aspect of the present invention, the outer member preferably has a retaining portion and a holder. The retaining portion is disposed outside the rolling element in the radial direction and retains the rolling element. The holder is disposed on the retaining portion and rotates integrally with the retaining portion. The first convex portion is disposed on the holder.

In this configuration, the outer member receives the first external force in the axial direction at the first convex portion of the holder. This allows the braking force to act stably on the outer member.

In the one-way clutch unit for the fishing reel according to another aspect of the present invention, the holder preferably has a first holder and a second holder. The first holder is disposed on the retaining portion to cover an end of the shaft member. The second holder is disposed on the opposite side of the first holder in the axial direction.

In this configuration, the first and second holders are provided in the retaining portion. The outer member receives the first external force in the first holder in the axial direction. This allows the braking force to act stably on the outer member.

In the one-way clutch unit for the fishing reel in accordance with another aspect of the present invention, the first and second holders are preferably bonded or press-fitted to the retaining portion. In this configuration, the first and second holders can be suitably attached to the retaining portion.

In the one-way clutch unit for the fishing reel in accordance with another aspect of the present invention, the first and second holders preferably hold the retaining portions by being screwed together. In this configuration, the first and second holders can be suitably attached to the retaining portion.

In the one-way clutch unit for the fishing reel according to another aspect of the present invention, the first external force receiving portion preferably has an annular second convex portion protruding in the axial direction. In this configuration, the outer member receives the first external force in the axial direction at the annular second convex portion. This allows the braking force to act stably on the outer member.

In the one-way clutch unit for the fishing reel according to another aspect of the present invention, the outer member is preferably further provided with a second external force receiving portion that receives a second external force acting in a direction opposite to the first external force.

In this configuration, the outer member can be braked by the first external force acting on the first external force receiving portion and the second external force acting on the second external force receiving portion. As a result, the braking force can be stably applied to the outer member.

A fishing reel according to one aspect of the present invention has a reel body, a shaft member configured to rotate with respect to the reel body, and the one-way clutch unit described above. In this case, the one-way clutch unit is installed in the reel body and brakes the rotation of the shaft member. By this configuration, the same effects as those described above can be obtained in the fishing reel.

In the fishing reel according to another aspect of the present invention, the shaft member preferably has a projection. The outer member has a retaining portion and a holder. The retaining portion is disposed outside the rolling element in a radial direction away from the axle of the shaft member and retains the rolling element. The holder is disposed on the retaining portion and rotates integrally with the retaining portion.

The holder has a first holder and a second holder. The first holder is disposed on the retaining portion to cover an end of the shaft member. The second holder is disposed on the retaining portion on the opposite side of the first holder in the axial direction in which the axle extends. The second holder has a recess, which engages the projection. In this configuration, the shaft member can be suitably positioned in the second holder by engaging the projection of the shaft member in the recess.

According to the present invention, a braking force can be stably applied to the outer member in the one-way clutch unit for a fishing reel.

DETAILED DESCRIPTION

Figure 1:
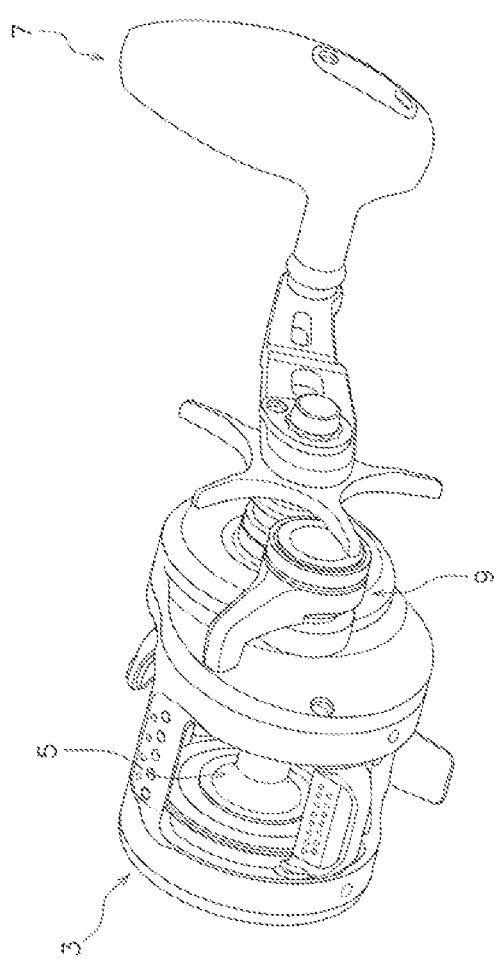
FIG. 1 is a perspective view of a double bearing reel.
Figure 2:
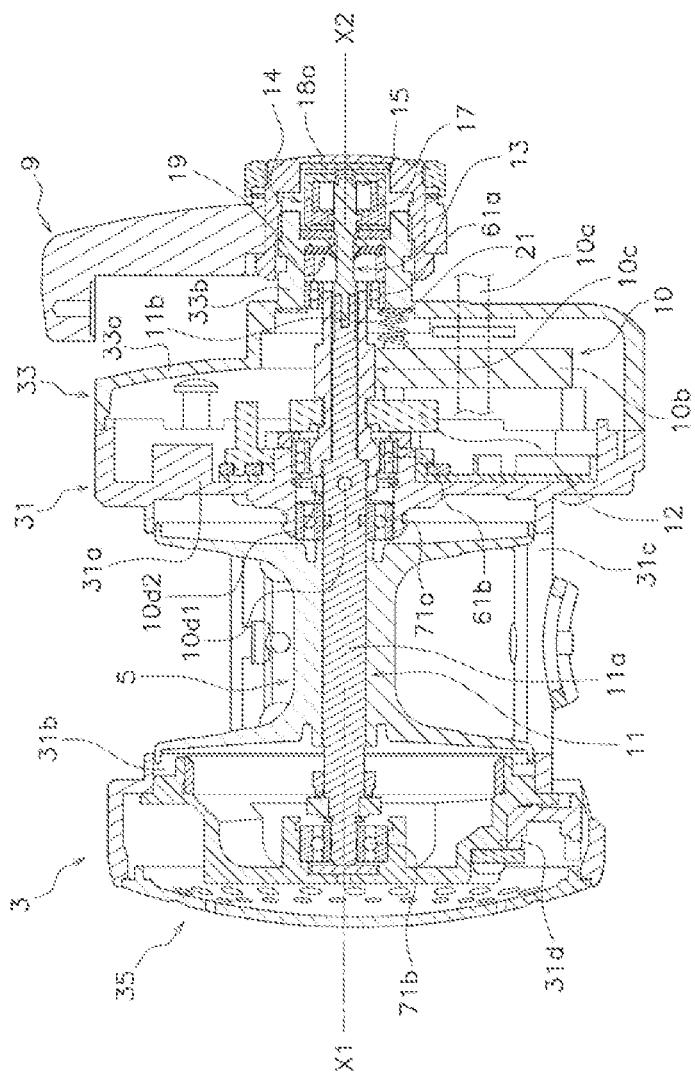
FIG. 2 is a cross-sectional view of the double bearing reel.

The following is a description of an embodiment of a double-bearing reel 1 (an example of a fishing reel) in accordance with the present invention with reference to the drawings. As shown in FIG. 1, the double-bearing reel 1 includes a reel body 3, a spool 5, a handle 7, and an operation lever 9. As shown in FIG. 2, the double-bearing reel 1 further includes a spool shaft 11 (an example of a shaft member), a connecting shaft 13 (an example of a shaft member), and a one-way clutch unit 14. The double-bearing reel 1 further includes a first seal member 19 and a second seal member 20.

An axial direction is the direction in which a first axle X1 of the spool shaft 11 extends. A radial direction is the direction perpendicular to the first axle X1 of the spool shaft 11 and extends away from the first axle X1 of the spool shaft 11. A circumferential direction is the direction around the first axle X1 of the spool shaft 11.

As shown in FIG. 2, the reel body 3 includes a frame 31, a first side cover 33, and a second side cover 35. The frame 31 has a first side plate 31a, a second side plate 31b, and a plurality of connecting portions 31c. The first and second side plates 31a and 31b are spaced apart from each other in the axial direction. The first side plate 31a and the second side plate 31b are connected to each other via the plurality of connecting portions 31c. The first side plate 31a, the second side plate 31b, and the plurality of connecting portions 31c are integrally formed.

The first side cover 33 covers the first side plate 31a. For example, the first side cover 33 has a cover body 33a and a protruding portion 33b. The cover body 33a covers the first side plate 31a is between the handle 7 and the first side plate 31a. The protruding portion 33b protrudes outward from the cover body 33a in the axial direction. The protruding portion 33b is formed in a cylindrical shape. The protruding portion 33b extends from the interior space of the first side cover 33 and the first side plate 31a to the exterior space thereof. The second side cover 35 covers the second side plate 31b. In more detail, the second side cover 35 covers the second side plate 31b on the opposite side of the handle 7.

As shown in FIG. 2, the spool 5 is rotatably supported by the reel body 3. For example, the spool 5 is mounted on the spool shaft 11 so that the spool 5 rotates integrally with the spool shaft 11. In other words, the spool 5 is rotatably supported by the reel body 3 via the spool shaft 11.

The handle 7 shown in FIG. 1 is a component for rotating the spool shaft 11. The handle 7 is attached to the reel body 3. For example, the handle 7 is rotatably supported by the reel body 3 via a drive shaft 10a shown in FIG. 2. For example, when the handle 7 and the drive shaft 10a rotate, the spool shaft 11 and the spool 5 are caused to rotate by a rotation transmission mechanism 10.

As shown in FIG. 2, the rotation transmission mechanism 10 is disposed in the interior space of the first side cover 33 and the first side plate 31a. The rotation transmission mechanism 10 transmits the rotation of the handle 7 to the spool shaft 11. The rotation transmission mechanism 10 includes the drive shaft 10a, a drive gear 10b, and a pinion gear 10c.

The drive shaft 10a is rotatably supported by the first side plate 31a and the first side cover 33. The drive shaft 10a rotates integrally with the handle 7. The drive gear 10b rotates integrally with the drive shaft 10a.

The pinion gear 10c is rotatably supported by the first side plate 31a and the first side cover 33 via a plurality of bearings 61a, 61b. The pinion gear 10c meshes with the drive gear 10b. The pinion gear 10c is formed in a cylindrical shape. The spool shaft 11 is inserted into the inner circumference of the pinion gear 10c.

The pinion gear 10c is guided axially along the spool shaft 11 by a clutch yoke 12. The rotation of the pinion gear 10c to the spool shaft 11 is transmitted by engagement of an engagement pin 10d1 of the spool shaft 11 and an engagement recess 10d2 of the pinion gear 10c. When the engagement of the engagement pin 10d1 and the engagement recess 10d2 is disengaged, the rotation of pinion gear 10c is not transmitted to spool shaft 11.

As shown in FIGS. 1 and 2, the operation lever 9 is attached to the reel body 3. For example, as shown in FIG. 2, the operation lever 9 is attached to the protruding portion 33b of the first side cover 33. In more detail, the operation lever 9 is attached to the protruding portion 33b in a swingable manner.

The swing movement of the operation lever 9 presses the one-way clutch unit 14 in the axial direction. For example, the swing movement of the operation lever 9 causes the one-way clutch unit 14 to be pressed in the axial direction between a first friction plate 18a and a second friction plate 18b.

The spool shaft 11 rotates integrally with the spool 5. The spool shaft 11 is rotatable with respect to the reel body 3. As shown in FIG. 2, the spool shaft 11 is rotatably supported by the reel body 3. For example, the spool shaft 11 is supported by the reel body 3 via a plurality of bearings 71a, 71b.

Figure 3:
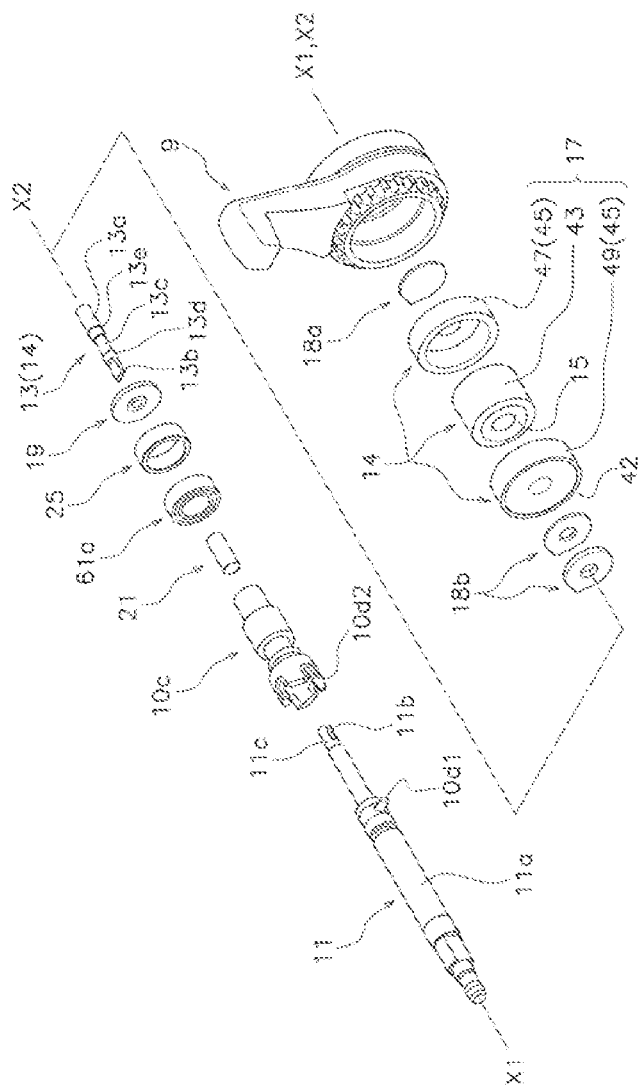
FIG. 3 is an exploded perspective view of a spool shaft and a connecting shaft, and peripheral components related to the spool shaft and the connecting shaft.
Figure 4:
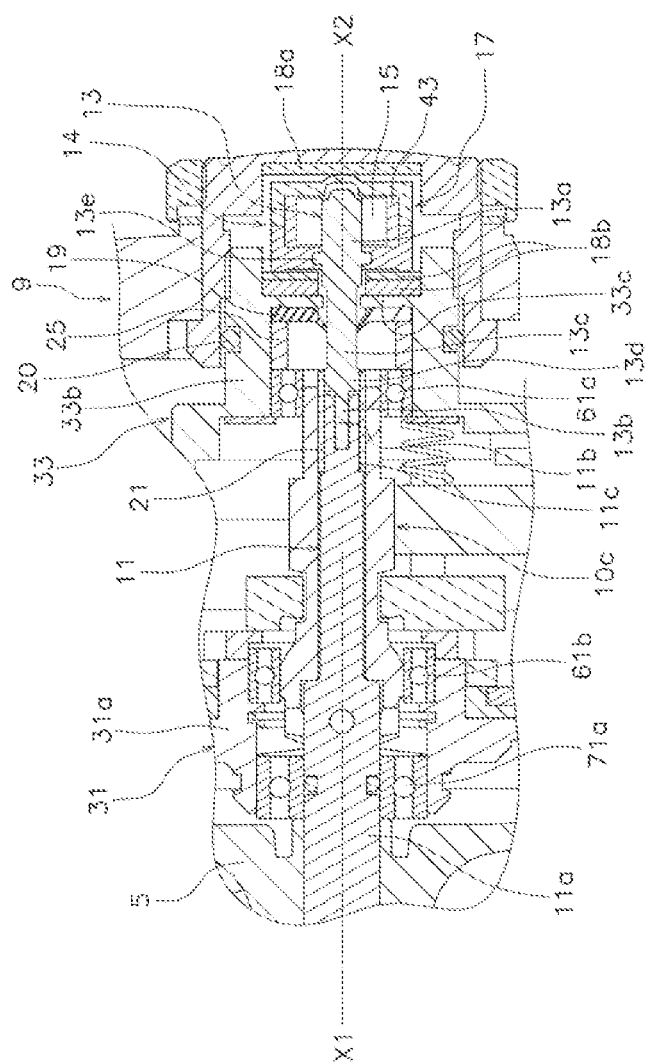
FIG. 4 is a partially enlarged cross-sectional view of the double bearing reel.

As shown in FIGS. 2, 3, and 4, the spool shaft 11 has a first shaft body 11a and a recess 11b. The first shaft body 11a has the first axle X1.

As shown in FIG. 2, the spool 5 is attached to the first shaft body 11a so that the spool 5 rotates integrally with the first shaft body 11a. The center portion of the first shaft body 11a is rotatably supported by the first side plate 31a via the bearing 71a. An end of the first shaft body 11a, located on the opposite side of the handle 7, is rotatably supported by a bearing member 31d via the bearing 71b. The bearing member 31d is attached to the second side plate 31b.

As shown in FIGS. 2 and 4, the first shaft body 11a is inserted into the inner circumference of the pinion gear 10c. For example, a part of the handle 7 side of the first shaft body 11a is inserted into the pinion gear 10c.

As shown in FIG. 4, the other end of the first shaft body 11a on the handle 7 side has an annular step 11c. The step 11c is formed on the outer circumference of this end of the shaft body 11a. The step 11c is spaced apart from the inner circumferential surface of the pinion gear 10c in the radial direction. A tubular member 21 is disposed in the step 11c.

The tubular member 21 regulates the radial movement of an engagement portion 13b of the connecting shaft 13, described below, within the recess 11b of the spool shaft 11. As shown in FIG. 4, the tubular member 21 is positioned between the end of the spool shaft 11 on the handle 7 side and the pinion gear 10c in the radial direction.

For example, the tubular member 21 is positioned between the step 11c of the first shaft body 11a and the inner circumference of the pinion gear 10c in the radial direction. In a state where the recess 11b of the spool shaft 11 and the engagement portion 13b of the connecting shaft 13 are engaged, the end of the tubular member 21 is placed on the outer circumference of an annular portion 13d of the connecting shaft 13.

As shown in FIGS. 2, 3, and 4, the recess 11b is provided at the end of spool shaft 11. For example, the recess 11b is located at the end of the first shaft body 11a on the handle 7 side. The recess 11b is a groove extending in the radial direction.

Figure 5:
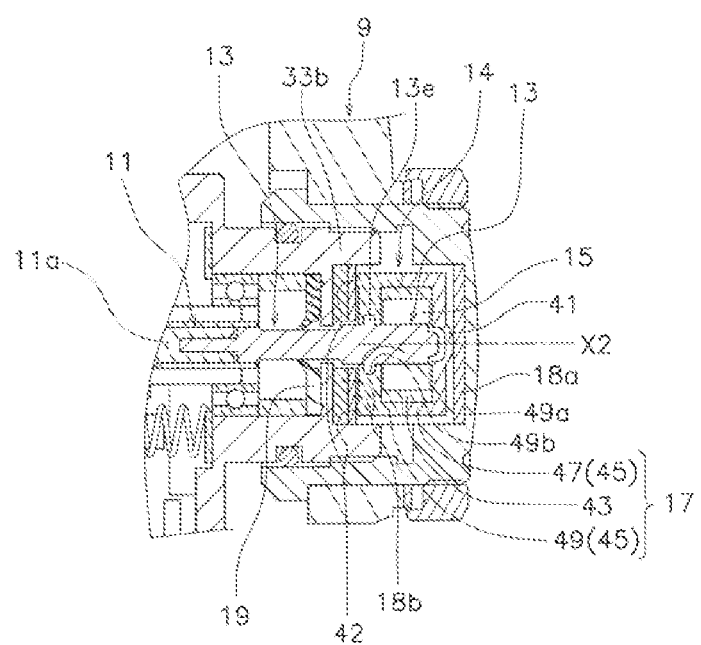
FIG. 5 is a partially enlarged cross-sectional view near a one-way clutch unit.

The connecting shaft 13 is configured to rotate with respect to the reel body 3. As shown in FIG. 4, the connecting shaft 13 is rotatably supported by the reel body 3 via the spool shaft 11. As shown in FIGS. 4 and 5, the connecting shaft 13 rotates integrally with the spool shaft 11. The connecting shaft 13 is connected to the spool shaft 11. For example, the connecting shaft 13 is connected to the end of the first shaft body 11a on the handle 7 side in the axial direction.

As shown in FIGS. 3 and 4, the connecting shaft 13 has a second shaft body 13a, the engagement portion 13b, a first small diameter portion 13c, and a projection 13e. The connecting shaft 13 further has the annular portion 13d.

As shown in FIG. 4, the second shaft body 13a is positioned inside a rolling element 15 in the radial direction about a second axle X2, as described below. The second shaft body 13a contacts the rolling element 15. For example, the second shaft body 13a is formed in a cylindrical shape (see FIG. 3). The second shaft body 13a has the second axle X2. In a state where the connecting shaft 13 is connected to the spool shaft 11, the second axle X2 is concentric with the first axle X1 of the spool shaft 11.

As shown in FIGS. 3 and 4, the engagement portion 13b is provided on the second shaft body 13a. For example, the engagement portion 13b is provided on the second shaft body 13a via the first small diameter portion 13c. As shown in FIG. 4, the engagement portion 13b engages with the recess 11b of the spool shaft 11. For example, the engagement portion 13b engages with the recess 11b at an end of the first shaft body 11a on the handle 7 side.

As shown in FIG. 3, the cross section of the engagement portion 13b is formed in a non-circular shape, for example, rectangular. By engaging the rectangular-shaped engagement portion 13b and the groove-shaped recess 11b with each other, the second shaft body 13a of the connecting shaft 13 rotates integrally with the first shaft body 11a of the spool shaft 11.

As shown in FIGS. 3 and 4, the first small diameter portion 13c is provided between the second shaft body 13a and the engagement portion 13b. In more detail, the first small diameter portion 13c is provided between the second shaft body 13a and the annular portion 13d. The first small diameter portion 13c is formed in a cylindrical shape. The outer diameter of the first small diameter portion 13c is smaller than the outer diameter of the second shaft body 13a. The annular portion 13d is provided between the engagement portion 13b and the first small diameter portion 13c. The outer diameter of the annular portion 13d is larger than the outer diameter of the first small diameter portion 13c.

As shown in FIGS. 3 and 4, the projection 13e is provided on the second shaft body 13a. For example, the projection 13e protrudes from the outer circumference of the second shaft body 13a in the radial direction away from the second axle X2. The projection 13e is formed in an annular shape on the outer circumference of the second shaft body 13a in the circumferential direction around the second axle X2. The projection 13e engages with a recess 49b of a second holder 49, described below (see FIG. 5).

In this embodiment, an example is shown where the projection 13e is formed in an annular shape, but at least one projection 13e can be formed on part of the outer circumference of the second shaft body 13a.

The one-way clutch unit 14 is configured to brake the rotation of the spool shaft 11. In this embodiment, the one-way clutch unit 14 brakes the rotation of the connecting shaft 13, and brakes the rotation of the spool shaft 11 via the connecting shaft 13. As shown in FIG. 4, the one-way clutch unit 14 is mounted on the connecting shaft 13. The one-way clutch unit 14 is positioned between the connecting shaft 13 and the protruding portion 33b of the first side cover 33 in the radial direction away from the second axle X2 of the connecting shaft 13.

As shown in FIGS. 3 and 4, the one-way clutch unit 14 has the rolling element 15 and an outer member 17. As shown in FIG. 4, the rolling element 15 is positioned between connecting shaft 13 and the outer member 17. For example, the rolling element 15 is positioned between the second shaft body 13a of the connecting shaft 13 and the outer member 17.

As shown in FIG. 4, the rolling element 15 contacts the connecting shaft 13 in the radial direction away from the second axle X2 of the connecting shaft 13. For example, in a state where the connecting shaft 13 is connected to the spool shaft 11, the rolling element 15 contacts the second shaft body 13a of the connecting shaft 13 in the radial direction away from the first axle X1 of the spool shaft 11.

In a state where the connecting shaft 13 is not connected to the spool shaft 11, the rolling element 15 contacts the second shaft body 13a of the connecting shaft 13 in the radial direction away from the second axle X2 of the connecting shaft 13.

When the connecting shaft 13 rotates in the fishing-line winding direction in a state where the rolling element 15 is in contact with the connecting shaft 13, the rolling element 15 rotates relative to the outer member 17. In other words, in this case, the rolling element 15 does not transmit the rotation of the connecting shaft 13 in the fishing-line winding direction to the outer member 17. On the other hand, in a case where the connecting shaft 13 rotates in the fishing-line feeding direction, the rolling element 15 transmits the rotation of the connecting shaft 13 in the fishing-line feeding direction to the outer member 17.

The outer member 17 is configured to rotate integrally with the connecting shaft 13 only in one direction in the circumferential direction around the second axle X2 of the connecting shaft 13. As shown in FIG. 5, the outer member 17 is provided with a first convex portion 41 (an example of a first external force receiving portion) that receives a first external force in the axial direction in which the second axle X2 of the connecting shaft 13 extends. The outer member 17 is further provided with a second convex portion 42 (an example of a second external force receiving portion) that receives a second external force acting in the direction opposite to the first external force.

The first external force is a pressing force acting on the first convex portion 41 from the first friction plate 18a. The second external force is a pressing force acting on the second convex portion 42 from the second friction plate 18b. For example, the swing movement of the operation lever 9 changes the distance between the first friction plate 18a and the second friction plate 18b. The pressing forces acting on the first convex portion 41 and the second convex portion 42 change according to the changes in the distance between the first friction plate 18a and the second friction plate 18b.

As shown in FIGS. 4 and 5, the outer member 17, for example, an outer ring 43 (an example of a retaining portion) described below, is located outside the rolling element 15 in the radial direction away from the second axle X2 of the connecting shaft 13. The outer member 17, for example, the outer ring 43, can rotate with respect to the reel body 3. For example, the outer member 17 e.g., the outer ring 43 can rotate with respect to the protruding portion 33b of the first side cover 33.

In a case where the connecting shaft 13 rotates with the spool shaft 11 in the fishing-line feeding direction, the rolling element 15 transmits the rotation in the fishing-line feeding direction to the outer member 17, for example, the outer ring 43. In other words, the outer member 17, for example, the outer ring 43, rotates integrally with the connecting shaft 13 only in the fishing-line feeding direction. Therefore, in this embodiment, the above "one direction" corresponds to the "fishing-line feeding direction."

As shown in FIGS. 3 and 5, the outer member 17 has the outer ring 43 and a holder 45. The outer ring 43 holds the rolling element 15. The outer ring 43 is positioned outside the rolling element 15 in the radial direction away from the second axle X2 of the connecting shaft 13. The outer ring 43 is configured to rotate integrally with the connecting shaft 13 only in one direction in the circumferential direction around the second axle X2 of the connecting shaft 13.

As shown in FIG. 5, the holder 45 is provided on the outer ring 43. In more detail, the holder 45 is provided on the outer ring 43 to cover an end of the connecting shaft 13. The holder 45 rotates integrally with outer ring 43. The holder 45 is provided with the first convex portion 41 and the second convex portion 42.

For example, the holder 45 has a first holder 47 and the second holder 49. The first holder 47 is provided on the outer ring 43 to cover the end of the connecting shaft 13. The first holder 47 is provided on the outer ring 43 to cover an end of the outer ring 43. The first holder 47 is bonded or press-fitted to the outer ring 43. This allows the first holder 47 to rotate integrally with the outer ring 43.

As shown in FIG. 5, the first holder 47 is provided with the first convex portion 41. The first convex portion 41 protrudes from the first holder 47 in the axial direction in which the second axle X2 of the connecting shaft 13 extends. For example, the first convex portion 41 protrudes from the first holder 47 so that the second axle X2 extends through the first convex portion 41. The first convex portion 41 contacts the first friction plate 18a.

The first friction plate 18a is attached non-rotatably to the operation lever 9. As shown in FIGS. 4 and 5, the first friction plate 18a is positioned between the first holder 47 and the operation lever 9 in the axial direction in which the second axle X2 of the connecting shaft 13 extends. The first friction plate 18a contacts the first convex portion 41 and the operation lever 9 in the axial direction in which the second axle X2 of the connecting shaft 13 extends.

As shown in FIG. 5, the second holder 49 is provided on the outer ring 43 on the opposite side of the first holder 47 in the axial direction in which the second axle X2 of the connecting shaft 13 extends. The second holder 49 is provided on the outer ring 43 to cover the other end of the outer ring 43. The second holder 49 is bonded or press-fitted to the outer ring 43. As a result, the second holder 49 rotates integrally with the outer ring 43. In other words, the first and second holders 47 and 49 rotate integrally with the outer ring 43.

The second holder 49 is provided with the second convex portion 42. The second convex portion 42 protrudes from the second holder 49 in the axial direction in which the second axle X2 of the connecting shaft 13 extends. For example, the second convex portion 42 is formed in an annular shape.

The second convex portion 42 contacts the second friction plate 18b. The second holder 49 is provided with the recess 49b. For example, the second holder 49 has a hole 49a. The recess 49b is formed in an annular shape on the inner circumferential surface of the hole 49a. The projection 13e of the connecting shaft 13 engages in the recess 49b.

As shown in FIGS. 4 and 5, at least one second friction plate 18b is attached non-rotatably to the protruding portion 33b of the first side cover 33. For example, the at least one second friction plate 18b includes a plurality (e.g., two) of second friction plates 18b.

The plurality (e.g., two) of second friction plates 18b are positioned between the second holder 49 and the first seal member 19 in the axial direction in which the second axle X2 of the connecting shaft 13 extends. The plurality of second friction plates 18b are positioned between the second holder 49 and a flange 33c on the inner circumference of the protruding portion 33b in the axial direction in which the second axle X2 of the connecting shaft 13 extends.

As shown in FIG. 3, the plurality of second friction plates 18b are annular plate members. As shown in FIG. 5, one second friction plate 18b contacts the second convex portion 42 in the axial direction in which the second axle X2 of the connecting shaft 13 extends. The other second friction plate 18b contacts the flange 33c of the protruding portion 33b (see FIG. 4) in the axial direction in which the second axle X2 of the connecting shaft 13 extends.

As shown in FIG. 5, the first convex portion 41 and the second convex portion 42 contact the first friction plate 18a and the second friction plate 18b respectively in the axial direction in which the second axle X2 of the connecting shaft 13 extends. In this state, the first and second holders 47 and 49 are held between the first and second friction plates 18a and 18b, respectively. As a result, in a case where the outer member 17 rotates, the rotation of the outer member 17 is braked by the first friction plate 18a and the second friction plate 18b.

As shown in FIG. 4, the first seal member 19 is positioned between the spool shaft 11 and the rolling element 15 in the axial direction. In this state, the first seal member 19 contacts the connecting shaft 13. The first seal member 19 is formed in an annular shape (see FIG. 3).

As shown in FIG. 4, the first seal member 19 is positioned between the spool shaft 11 and the one-way clutch unit 14 in the axial direction. For example, the first seal member 19 is in contact with the flange 33c of the protruding portion 33b in the axial direction. The tip of the first seal member 19 is positioned between the spool shaft 11 and the rolling element 15 in the axial direction. In this state, the tip of the first seal member 19, e.g., the inner circumferential surface of the first seal member 19, contacts the first small diameter portion 13c of the connecting shaft 13.

As shown in FIGS. 3 and 4, a positioning member 25 is placed between the first seal member 19 and the bearing 61a. For example, the positioning member 25 is formed in a cylindrical shape. The positioning member 25 is in contact with the outer circumference of the first seal member 19 and the outer ring of the bearing 61a in the axial direction. The positioning member 25 restricts the movement of the first seal member 19 in the axial direction.

As shown in FIG. 4, the second seal member 20 stops water from entering through the gap between the operation lever 9 and the protruding portion 33b. The second seal member 20 is positioned between the operation lever 9 and the protruding portion 33b in the radial direction. For example, the second seal member 20 is an O-ring.

The double-bearing reel 1 having the above configuration is equipped with the reel body 3 and the one-way clutch unit 14. In the one-way clutch unit 14, the outer member 17 receives a pressing force in the axial direction at the first convex portion 41 (an example of a first external force receiving portion) of the holder 45. This allows the braking force to act stably on the outer member 17.

In more detail, in the one-way clutch unit 14, the holder 45 has the first holder 47 and the second holder 49. The outer member 17 receives a pressing force axially at the first convex portion 41 of the first holder 47. This allows the braking force to act stably on the outer member 17.

In the one-way clutch unit 14, the outer member 17 receives a pressing force in the axial direction at the second convex portion 42 (an example of a second external force receiving portion) of the second holder 49. This allows the braking force to act stably on the outer member 17.

In the one-way clutch unit 14, the outer member 17 is braked by the pressing force acting from the first friction plate 18a to the first convex portion 41 and the pressing force acting from the second friction plate 18b to the second convex portion 42. This allows the braking force to act stably on the outer member 17.

In the one-way clutch unit 14, the first and second holders 47 and 49 are bonded or press-fitted to the outer ring 43, so the first and second holders 47 and 49 can be suitably attached to the outer ring 43.

In the one-way clutch unit 14, the projection 13e of the connecting shaft 13 engages with the recess 49b of the second holder 49. This allows the connecting shaft 13 to be suitably positioned in the second holder 49.

Modification 1

Figure 6A:
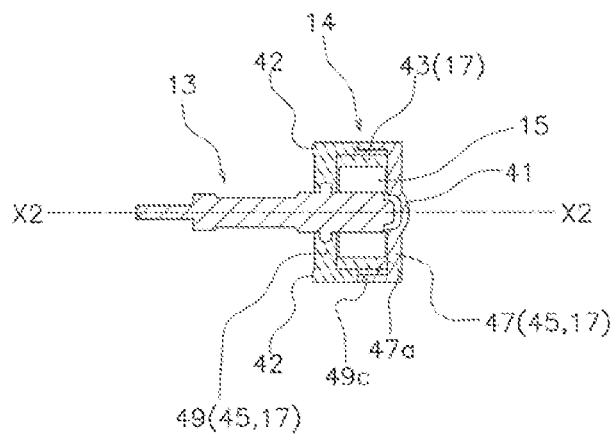
FIG. 6A is a partially enlarged cross-sectional view of the one-way clutch unit according to Modification 1.

In the above embodiment, the first and second holders 47 and 49 are bonded or press-fitted to the outer ring 43. As shown in FIG. 6A, however, the first and second holders 47 and 49 may hold the outer ring 43 by being screwed with each other.

In this case, for example, a female thread 47a is formed in the first holder 47. A male thread 49c is formed in the second holder 49. By screwing the female thread 47a with respect to the male thread 49c, the outer ring 43 is held between the first holder 47 and the second holder 49. The outer circumferential surface of the outer ring 43 may be bonded to the inner circumferential surface of the first holder 47 and the inner circumferential surface of the second holder 49 by adhesive. This configuration allows the first and second holders 47 and 49 to be suitably attached to the outer ring 43.

Modification 2

Figure 6B:
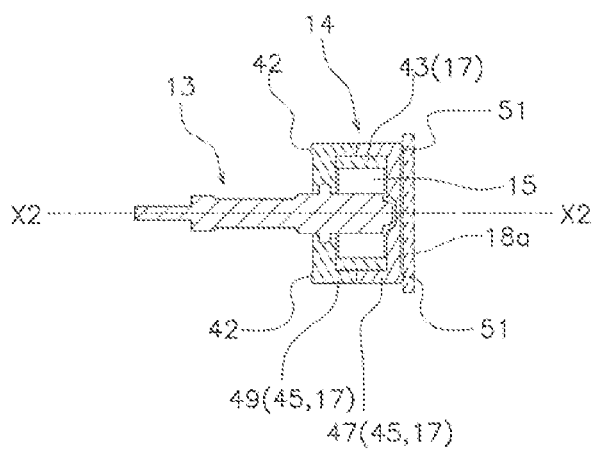
FIG. 6B is a partially enlarged cross-sectional view of the one-way clutch unit according to Modification 2.

In the above embodiment, the first convex portion 41 is formed on the first holder 47 so that the second axle X2 passes through the first convex portion 41. Alternatively, as shown in FIG. 6B, an annular third convex portion 51 (an example of a first external force receiving portion) may be formed on the first holder 47. In this case, the second axle X2 passes through the inner circumference of the annular third convex portion 51. Thus, even if the annular third convex portion 51 is formed on the first holder 47, the braking force can be stably applied to the outer member 17. In this case, the first and second holders 47 and 49 may also be screwed with each other as in Modification 1.

Figure 7:
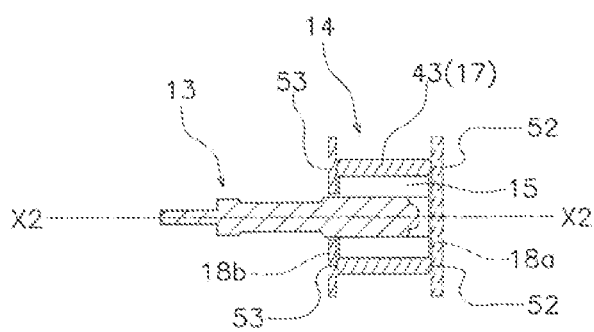
FIG. 7 is a partially enlarged cross-sectional view of the one-way clutch unit according to another embodiment (A).

Other Embodiments (A) In the above embodiment, the outer member 17 has the outer ring 43 and the holder 45. Alternatively, as shown in FIG. 7, the outer member 17 may have only the outer ring 43. In this case, an annular fourth convex 52 (an example of a first external force receptor) and an annular fifth convex 53 (an example of a second external force receptor) are provided on the outer ring 43. For example, the annular fourth convex portion 52 and the annular fifth convex portion 53 are formed integrally with the outer ring 43. The annular fourth convex portion 52 contacts the first friction plate 18a. The annular fifth convex portion 53 contacts the second friction plate 18b. Thus, even if the outer member 17 is configured without the holder 45, the braking force can be stably applied to the outer member 17.

Figure 8A:
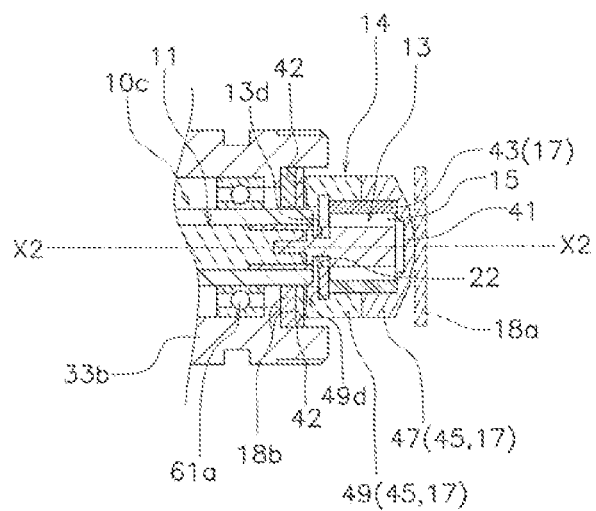
FIG. 8A is a partially enlarged cross-sectional view near the one-way clutch unit according to another embodiment (B).

(B) In the above embodiment, the first seal member 19 is positioned axially outside of the one-way clutch unit 14. As shown in FIG. 8A, the one-way clutch unit 14 may be configured so that the first seal member 19 is included in the one-way clutch unit 14.

In this case, the one-way clutch unit 14 has the rolling element 15, the outer member 17, and a third seal member 22. The outer member 17 has the outer ring 43 and he holder 45 including the first holder 47 and the second holder 49.

An annular recess 49d is formed on the inner circumferential surface of the second holder 49. The outer circumference of the third seal member 22 is placed in the annular recess 49d. The tip of the third seal member 22, e.g., the inner circumferential surface of the third seal member 22, contacts the connecting shaft 13, e.g., the first small diameter portion 13c.

Thus, even if the one-way clutch unit 14 is configured to have the third seal member 22, the braking force can be stably applied to the outer member 17. In this configuration, water from the spool shaft 11 to the rolling element 15 can be stopped by the third seal member 22.

Figure 8B:
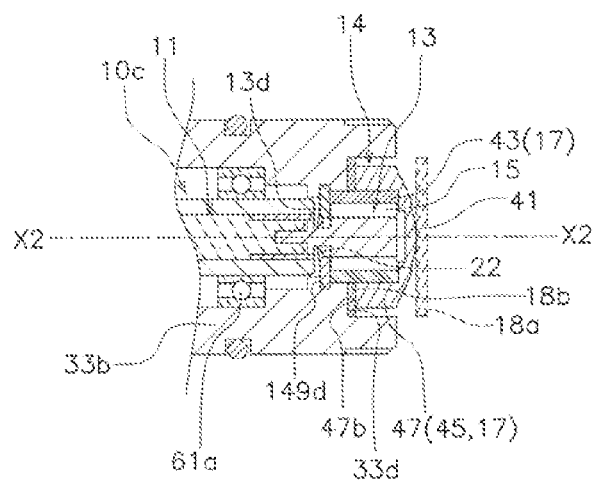
FIG. 8B is a partially enlarged cross-sectional view near the one-way clutch unit according to another embodiment (C).

(C) In the embodiment (B), the third seal member 22 is positioned between the rolling element 15 and the second friction plate 18b, as shown in FIG. 8A. In this case, water from the spool shaft 11 to the rolling element 15 is likely to adhere to the second friction plate 18b and reduce the durability of the second friction plate 18b. To solve this problem, the one-way clutch unit 14 may be configured as shown in FIG. 8B. For example, the first holder 47 is placed in an annular step 33d of the reel body 3. The annular step 33d is formed on the inner circumferential surface of the protruding portion 33b.

An opening end 47b (an example of a second external force receiving portion) of the first holder 47 is positioned to face the bottom of the annular step 33d. The annular second friction plate 18b is placed between the opening end 47b of the first holder 47 and the bottom of the annular step 33d. The opening end 47b of the first holder 47 contacts the annular second friction plate 18b. The first holder 47 is held between the first friction plate 18a and the second friction plate 18b. The third seal member 22 is placed in an annular recess 149d formed on the inner circumferential surface of the protruding portion 33b.

In this configuration, in a case where the outer ring 43 and the first holder 47, which constitute the outer member 17, rotate, the rotation of the outer member 17 is braked by the first friction plate 18a and the second friction plate 18b. With this configuration, the braking force can be stably applied to the outer member 17.

In this configuration, the second friction plate 18b is located outside the path of water from the spool shaft 11 to the rolling element 15, which enable to prevent water from adhering to the second friction plate 18b. This configuration improves the durability of the second friction plate 18b.

(D) In the above embodiment, as shown in FIG. 4, the bearing 71a supports the spool shaft 11. The bearing 61a supports the pinion gear 10c. This determines the position of the first axle X1 of the spool shaft 11 inserted into the inner circumference of the pinion gear 10c. The connecting shaft 13 is engaged with the spool shaft 11. As a result, the second axle X2 of the connecting shaft 13 is concentric with the first axle X1 of the spool shaft 11.

Figure 9A:
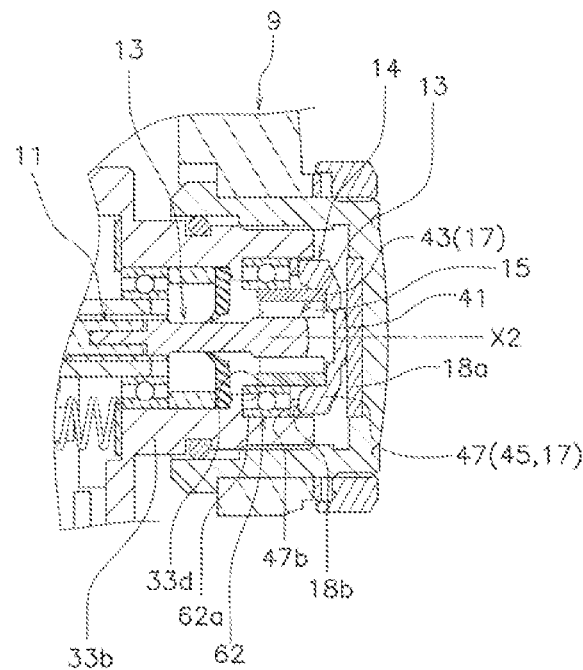
FIG. 9A is a partially enlarged cross-sectional view near the one-way clutch unit according to another embodiment (D).

In this case, depending on the accuracy of the connection of the connecting shaft 13 and the spool shaft 11, misalignment may occur between the second axle X2 of the connecting shaft 13 and the first axle X1 of the spool shaft 11. To solve this problem, the one-way clutch unit 14 can be supported by the reel body 3 via a bearing 62, as shown in FIG. 9A. For example, the one-way clutch unit 14 is supported by the protruding portion 33b of the reel body 3 via the bearing 62.

The bearing 62 is located in the annular step 33d of the reel body 3. The bearing 62 supports the one-way clutch unit 14 e.g., the outer ring 43 of the outer member 17. An outer ring 62a of the bearing 62 is in contact with the second friction plate 18b and the bottom of the step 33d of the protruding portion 33b in the axial direction in which the second axle X2 extends.

The first holder 47 is placed in the annular step 33d of the reel body 3. The opening end 47b (an example of a second external force receiving portion) of the first holder 47 is positioned to face the bottom of the annular step 33d. Between the opening end 47b of the first holder 47 and the bottom of the annular step 33d, the bearing 62 and the annular second friction plate 18b are located. The opening end 47b of the first holder 47 contacts the annular second friction plate 18b. The first holder 47 is held between the first friction plate 18a and the second friction plate 18b.

In this configuration, in a case where the outer ring 43 and the first holder 47, which constitute the outer member 17, rotate, the rotation of the outer member 17 is braked by the first friction plate 18a and the second friction plate 18b. With this configuration, the braking force can be stably applied to the outer member 17.

In this configuration, the bearing 62 supports the outer ring 43 of the outer member 17, so that the second axle X2 of the connecting shaft 13 can be suitably located on the first axle X1 of the spool shaft 11 in a state where the connecting shaft 13 is connected to the spool shaft 11.

Figure 9B:
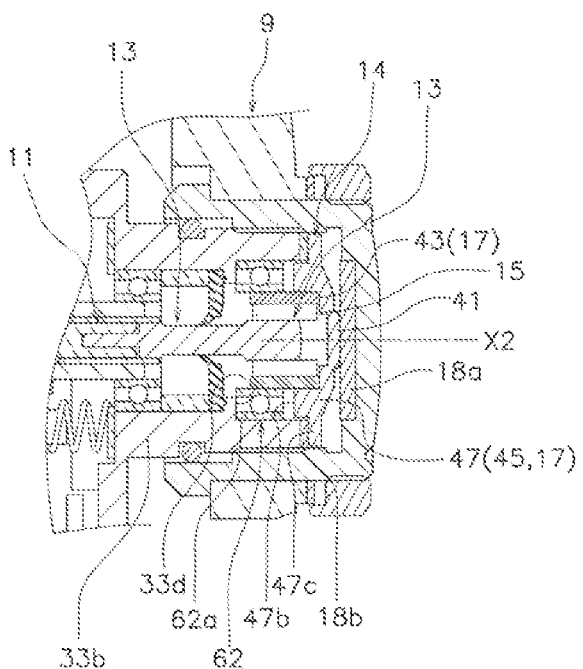
FIG. 9B is a partially enlarged cross-sectional view near the one-way clutch unit according to another embodiment (E).

(E) The first holder 47 of the outer member 17 according to the embodiment (D) above may be configured as shown in FIG. 9B. In this case, a gap is provided between the opening end 47b of the first holder 47 and the bearing 62 in the axial direction.

The first holder 47 has the first convex portion 41 (an example of a first external force receiving portion) and the flange 47c (an example of a second external force receiving portion). The flange 47c protrudes in the radial direction away from the second axle X2 and extends in the circumferential direction around the second axle X2.

The flange 47c is positioned to face the end of the protruding portion 33b of the reel body 3 in the axial direction in which the second axle X2 extends. The second friction plate 18b is positioned between the axial ends of the flange 47c and the protruding portion 33b. The ends of the flange 47c and the protruding portion 33b contact the second friction plate 18b. This configuration has the same effect as in the embodiment (D) above.

(F) The above and other embodiments show an example where the spool shaft 11 is attached to the one-way clutch unit 14 via the connecting shaft 13. Alternatively, the spool shaft 11 may be directly attached to the one-way clutch unit 14 by forming the connecting shaft 13 as an integral part of the spool shaft 11. In this case, the spool shaft 11 is interpreted as a shaft member that is braked by the one-way clutch unit 14.

REFERENCE SIGNS LIST

1 Double-bearing reel
3 Reel body
5 Spool
9 Operation lever
11 Spool shaft
11b Recess
13 Coupling shaft
13e Projection
14 One-way clutch unit
15 Rolling element
17 Outer member
18a 1st friction plate 18b Second friction plate
41 First convex portion
42 Second convex portion
43 Outer ring
45 Holder
47 1st Holder
49 Second Holder
49b Recess
X1 First axle
X2 Second axle

What is claimed is:

1. A one-way clutch unit for a fishing reel configured to brake a rotation of a shaft member of the fishing reel, the one-way clutch comprising:
   a rolling element that contacts the shaft member in a radial direction away from an axle of the shaft member; and
   an outer member disposed outside the rolling element in the radial direction and configured to rotate in only one direction along a circumferential direction around the axle,
   the outer member including a first external force receiving portion that receives a first external force in an axial direction of the shaft member, the first external force receiving portion having a first convex portion protruding in the axial direction.

2. The one-way clutch unit for a fishing reel according to claim 1, wherein
   the outer member further includes a retaining portion and a holder, the retaining portion disposed outside the rolling element in the radial direction and configured to retain the rolling element, the holder disposed on the retaining portion and configured to rotate integrally with the retaining portion, and
   the first convex portion is disposed on the holder.

3. The one-way clutch unit for a fishing reel according to claim 2, wherein
   the holder includes a first holder and a second holder, the first holder disposed on the retaining portion to cover an end of the shaft member, the second holder disposed on the retaining portion on an opposite side of the first holder in the axial direction.

4. The one-way clutch unit for a fishing reel according to claim 3, wherein
   the first holder and the second holder are bonded or press-fitted to the retaining portion.

5. The one-way clutch unit for a fishing reel according to claim 3, wherein
   the first holder and the second holder are screwed with each other to hold the retaining portion therebetween.

6. The one-way clutch unit for a fishing reel according to claim 3, wherein
   the first holder and the second holder are configured to hold the retaining portion in a state where the retaining portion is disposed radially inside the first holder and the second holder.

7. The one-way clutch unit for a fishing reel according to claim 1, wherein
   the first convex portion is disposed such that the axle of the shaft member extends through the first convex portion.

8. The one-way clutch unit for a fishing reel according to claim 1, wherein
   the first external force receiving portion has an annular second convex portion protruding in the axial direction.

9. The one-way clutch unit for a fishing reel according to claim 1, wherein
   the outer member further includes a second external force receiving portion that receives a second external force acting in a direction opposite to the first external force.

10. The one-way clutch unit for a fishing reel according to claim 1, wherein
    the outer member further includes a second external force receiving portion that receives a second external force acting in a direction opposite to the first external force, and
    a radial dimension of the first external force receiving portion is smaller than a radial dimension of the second external force receiving portion.

11. A fishing reel comprising:
    a reel body;
    a shaft member configured to rotate with respect to the reel body; and
    the one-way clutch unit according to claim 1, installed in the reel body and configured to brake a rotation of the shaft member.

12. The fishing reel according to claim 11, wherein
    the shaft member has a projection,
    the outer member has a retaining portion and a holder, the retaining portion disposed outside the rolling element in the radial direction away from the axle of the shaft member and configured to retain the rolling element, the holder disposed on the retaining portion and configured to rotate integrally with the retaining portion,
    the holder includes a first holder and a second holder, the first holder disposed on the retaining portion to cover an end of the shaft member, the second holder disposed on the retaining portion on an opposite side of the first holder in the axial direction of the shaft member, and
    the second holder has a recess to engage with the projection.

13. The fishing reel according to claim 11, further comprising:
    a friction plate that contacts the first external force receiving portion, wherein
    the first external force receiving portion receives the first external force acting thereon by the friction plate.

* * * * *